United States Patent [19]
Newson

[11] Patent Number: 5,953,670
[45] Date of Patent: *Sep. 14, 1999

[54] ARRANGEMENT FOR PROVIDING CELLULAR COMMUNICATION VIA A CATV NETWORK

[75] Inventor: Paul Newson, Kanata, Canada

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/640,687

[22] Filed: May 1, 1996

[30] Foreign Application Priority Data

May 2, 1995 [GB] United Kingdom .................. 9508901

[51] Int. Cl.$^6$ ...................................................... H04H 7/00
[52] U.S. Cl. ............................ 455/454; 455/6.3; 455/414; 370/466; 370/487; 370/490; 348/6; 348/17
[58] Field of Search ................................ 455/6.3, 5.1, 3.1, 455/454, 414, 426, 7–25, 450, 455; 370/498, 464, 345, 466, 487, 490; 348/10, 13, 14, 6, 11, 12, 17

[56] References Cited

U.S. PATENT DOCUMENTS

| | | | |
|---|---|---|---|
| 5,381,459 | 1/1995 | Lappington | 348/10 |
| 5,421,030 | 5/1995 | Baran | 455/5.1 |
| 5,432,838 | 7/1995 | Purchase et al. | 348/6 |
| 5,453,868 | 9/1995 | Blauvelt et al. | 359/173 |
| 5,638,433 | 6/1997 | Roman | 455/6.3 |
| 5,640,196 | 6/1997 | Behrens et al. | 455/6.3 |
| 5,642,155 | 6/1997 | Cheng | 348/12 |

OTHER PUBLICATIONS

Lipoff, "Personal Communications Services and Cable TV", IEEE, pp. 22–25, Apr. 1992.
O'Byrne, "Digital Cellular Over the Cable Television Fiber–Optic Plant", IEEE, pp. 205–208, Apr. 1992.
Ariyavisitakul et al, "Performance of Simulcast Wireless Techniques for Personal Communications Systems", IEEE, pp. 91–96, Apr. 1995.
Beasley, "The Advantage of Using Cable TV Distribution Plant for Linking PCS–Microcells", IEEE, pp. 292–295, Feb. 1992.
Donaldson et al, "Wireless CATV Network Access for Personal Communications Using Simulcasting", IEEE Trans. on Vehicular Technology, vol. 43, No. 3, pp. 666–671, Aug. 1994.

*Primary Examiner*—Vu Le
*Attorney, Agent, or Firm*—Lee, Mann, Smith, McWilliams, Sweeney & Ohlson

[57] ABSTRACT

A CATV distribution network provides an interface between a cellular communications base station and a plurality of mobile terminals. A head end signal processor disposed at a head end of the CATV network provides a first frequency conversion between a cellular communications radio frequency and the CATV network transmission frequency. A plurality of remote antenna drivers are disposed at the remote end of the CATV network and provide a second frequency conversion between the cellular communications radio frequency and the CATV network transmission frequency. Antennas coupled to the remote antenna drivers provide radio communications with the mobile terminals. The remote antenna drivers are arranged in groups, each group being operated in a simulcast manner. Dynamic range compression of the cellular communications traffic is provided on the upstream path between the mobile terminals and the base station.

6 Claims, 9 Drawing Sheets

ARRANGEMENT FOR PROVIDING CELLULAR COMMUNICATION VIA A CATV NETWORK

This invention relates to cable TV (CATV) systems and in particular to the provision of cellular radio communications via a CATV system.

BACKGROUND OF THE INVENTION

Cable TV systems are becoming increasingly commonplace in urban areas where they provide a medium for the delivery of video services to customers. These systems have a large amount of spare bandwidth which the system providers can offer for the transport of additional services such as telephone traffic. A recent development of this telephony application has been a proposal to carry cellular communications traffic, e.g. GSM or PCS traffic, over the cable network. In such an arrangement, a cellular base station is coupled via the cable network to a number of antennas to provide communication with mobile units in the service area of the antennas. A proposed system for cellular communication over a CATV network is described by R W Donaldson in IEEE Transactions on Vehicular Technology, vol. 43 no. 3, pp666–70.

The potential use of CATV systems to carry cellular communications traffic has been restrained by a number of technical problems. Firstly, there is the problem of the limited dynamic range of most cable systems which results in significant performance degradation when handling cellular communications traffic. A typical cellular system requires a nominal dynamic range of approximately 80 dB, whereas a typical cable system offers a dynamic range of about 30 dB for the downstream path or down link, and between 20 and 45 dB on the upstream path or uplink. The 30 dB restriction on the down link is acceptable as cellular systems such as the GSM system can accommodate a signal to noise ratio as low as 9 dB. However, since the level at which uplink signals are directed into the cable sysytem is dependent on the distance between a mobile terminal and its associated antenna, any dynamic range restriction on the uplink results in a severe mismatch with the minimum sensitivity level of the cellular receiver. Under conditions that can be reasonably expected in a CATV system, this uplink dynamic range restriction reduces the effective rtansmission distance to an unacceptably low value. Secondly, cable systems intended for the transmission of mobile commmunications traffic are subject to the so-called near-far problem. Within a mobile system it is not possible to guarantee the signal level received at an antenna from a mobile. Consequently it is possible that low level transmissions from a wanted distant transmitter will be swamped by unwanted high power signals from a local transmitter operating on an adjacent channel. In a cable system, this problem is exacerbated by the inherent dynamic range limitation.

The object of the invention is to minimise or to overcome these disadvantages.

It is a further object of the invention to provide an improved communications sysaytem in which cellular communications traffic between mobile terminals and a base station is carried on a CATV network.

SUMMARY OF THE INVENTION

According to one aspect of the invention there is provided a cellular communications arrangement comprising a base station and a plurality of antennas coupled thereto via a cable communications network, said the antennas being arranged to operate in a simulcast mode, and wherein means are provided for compressing the dynamic range of cellular communications traffic carried on the cable network.

According to another aspect of the invention there is provided an arrangement for coupling a cellular communications base station with a plurality of mobile terminals via a CATV distribution network, the arrangement including a head end signal processor disposed at a head end of the CATV network and adapted to provide a first frequency conversion between a cellular communications radio frequency and a CATV network transmission frequency, a plurality of remote antenna drivers disposed at a remote end of the CATV network and adapted to provide a second frequency conversion between the cellular communications radio frequency and the CATV network transmission frequency, and antennas one coupled to each said remote antenna driver for providing radio communications with said mobile terminals, wherein the remote antenna drivers are arranged in groups, the drivers of each said group being operated on a common frequency in a simulcast mode, and wherein each said remote antenna driver incorporates means for compressing the dynamic range of cellular communications traffic carried on the cable network on an upstream path between the mobile terminals and the base station.

According to a further aspect of the invention there is provided a method of transmitting cellular communications traffic over a cable telecommunications network between a base station and a plurality of antennas, the method including operating the antennas in a simulcast mode, and compressing the dynamic range of cellular communications traffic carried on the cable network.

The arrangement is intended for use with the GSM communications system, but it is not of course limited to that application.

Although the cable system caries traffic at allocated cable frequencies, the interfaces between the base station and the system head end and between the antennas and mobile terminals operarate at the cellular system uplink and downlink frequencies. There is thus a transparent path provided for mobile communications traffic between the base station and the mobiles and no significant modification of the cellular system is required.

BRIEF DESCRIPTION OF THE DRAWINGS

An embodiment of the invention will now be described with reference to the accompanying drawings in which.

DESCRIPTION OF PREFERRED EMBODIMENT

Figure 1:
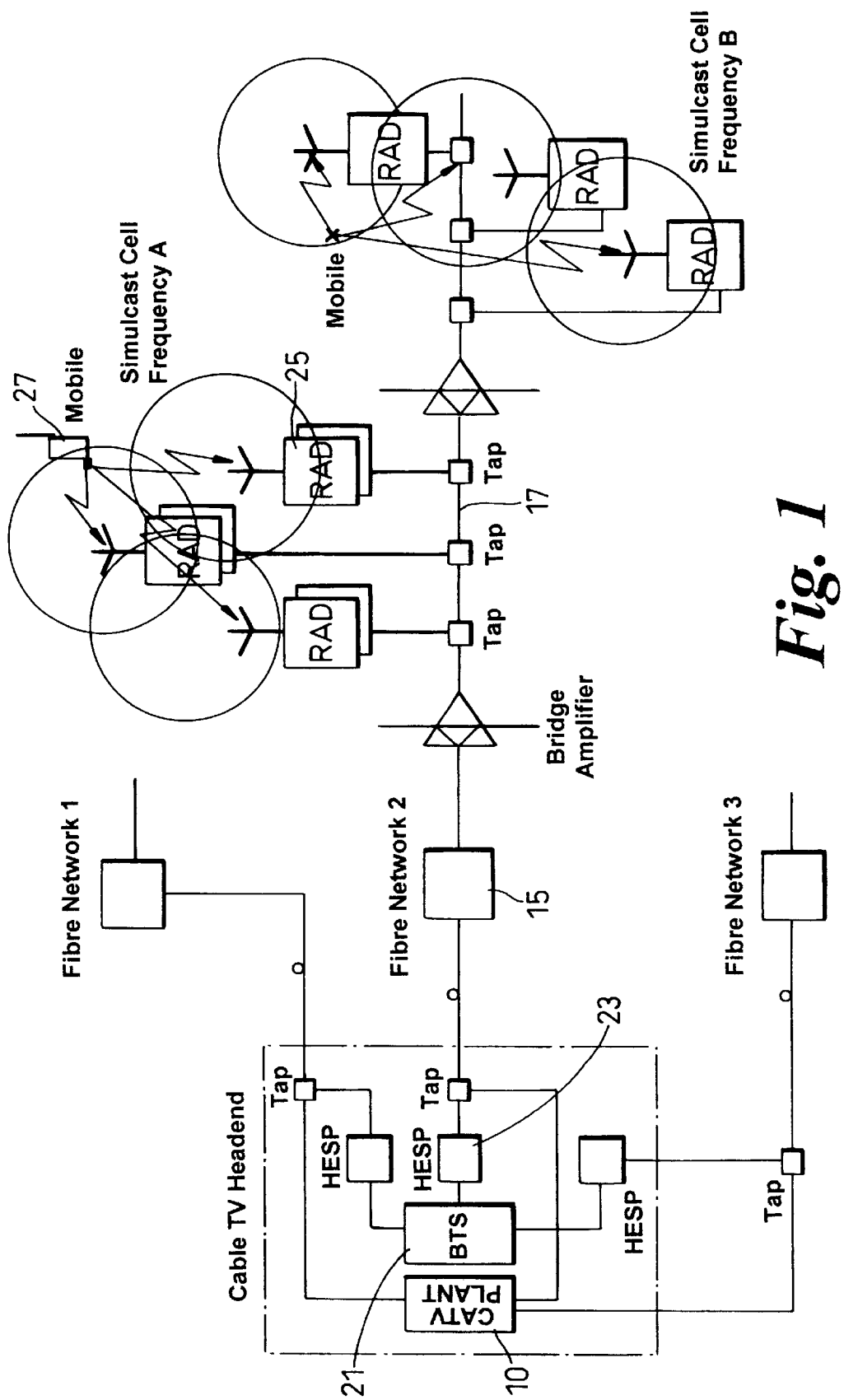
FIG. 1 is a general schematic diagram of a CATV system incorporating a cellular communications simulcast facility.

Referring to FIG. 1, the CATV system carries cable related traffic between a central CATV station 10, disposed at a head end 11, and a plurality of subscriber premises (not shown) via an optical fibre network 15 and a coaxial network 17. The system also carries cellular communications traffic between a cellular, e.g. GSM, base station 21, via a head end signal processor (HESP) 23 and a number of remote antenna drivers (RAD) 25 providing wireless communication with mobile terminals 27. Operation of the HESP and the RADs may be controlled by a processor (not shown) attached to the system. The RADs are operated in groups, the members of a group being operated on a common frequency in a simulcast manner for uplink and downlink traffic. The effect of simulcasting is to merge the coverage areas served by each RAD in the cluster into a single simulcast cell within which a mobile terminal may roam without the necessity for handoff. Communication is thus effectively distributed throughout the simulcast cell. In the arrangement of FIG. 1, the system head end incorporates a number of HESPs each serving a respective set of RAD groups via a respective fibre network and each coupled to the cellular base station.

Figure 2:
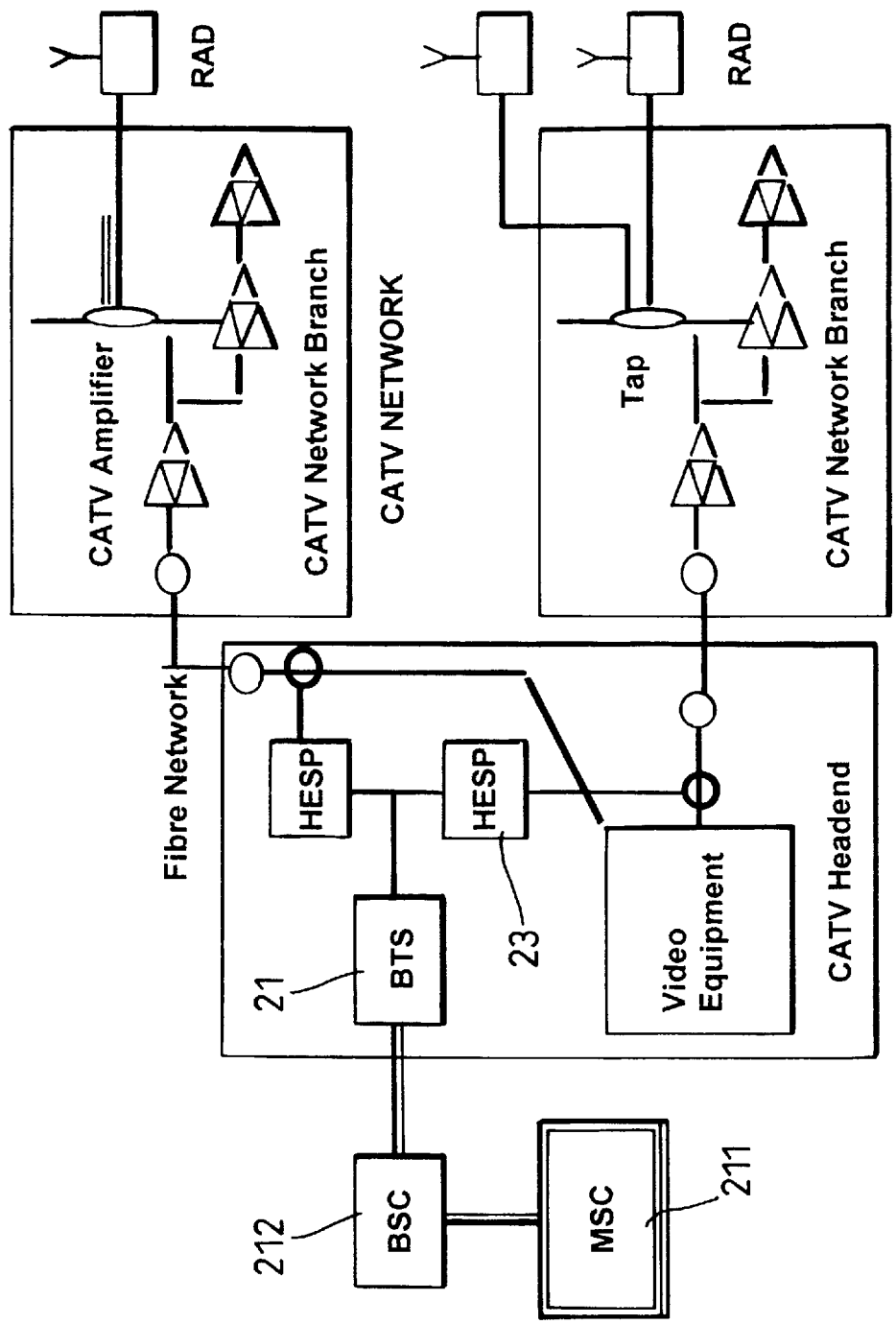
FIG. 2 is a simplified schematic diagram of the system of FIG. 1 illustrating its interaction with an associated cellular communications system.

As is shown in FIG. 2, the base station 21 is controlled from a mobile switching centre 211 and a base station controller 212 forming part of a GSM network. It will be appreciated that, in the interests of clarity, only those parts of the GSM network that are essential to the understanding of the invention are illustrated in FIG. 2.

Referring to FIGS. 1 and 2, on the downlink, each of the RAD's operating within a simulcast cluster transmits identical information to the mobile. In consequence, the mobile terminal receives several time shifted and attenuated versions of the same signal over the air interface. This is analogous to multipath reception in a conventional system having only one antenna per cell and a GSM handset is adapted to accommodate and process received signals of this form via a channel equalisation technique. Thus, within the mobile terminal, the received signals are correlated and simulcast induced intersymbol interference (ISI) is removed.

Simulcast operation on the uplink is similar to that described above. The signal transmitted from the mobile terminal is received by each of the RAD's in the simulcast cluster. Each RAD then transposes the radio signal to a frequency suitable for CATV upstream transmission. Since each RAD in the cluster operates on a substantially identical frequency both over the air interface and over the CATV network, the network itself is used to combine the uplink signals. At the system head end, the upstream cellur signals are converted or transposed back to the cellular traffic frequency by the HESP. At the base station, the simulcast signal is then processed and correlated to remove intersymbol interference. The use of simulcasting on the uplink significantly reduces the near-far problem as a mobile terminal that is distant from one RAD in the group will, in general, be sufficiently close to another RAD of that group to provide an adequate signal. Further, as the RADs of the group have a single operating frequency, potentially interfering adjacent channel users will in general operate to distant RAD groups and will therefore be received only at low signal levels.

The number and disposition of the RADs, which are operated in a simulcast arrangement, will depend on the coverage requirements and the anticipated user density. The RADs may be configured to operate at the same frequency to form a single large simulcast cell or they may be divided into frequency groups to provide a number of smaller simulcast cells. The particular broadcast frequency will be determined by the licensing authority, but it is expected that the uplink will be in a band between 1850 and 1859 MHz and that the downlink will be in a band between 1930 and 1975, there being a 80 MHz uplink/downlink diplex offset. Within each simulcast cell or cluster, the frequencies of the RADs are slightly offset from the nominal cell frequency typically by a value not exceeding 50 Hz. We have found that this frequency offset is sufficient to ensure that any nulls within the simulcast cell persist for a maximum of a single data burst but not so large as to degrade the system performance.

Figure 3A:
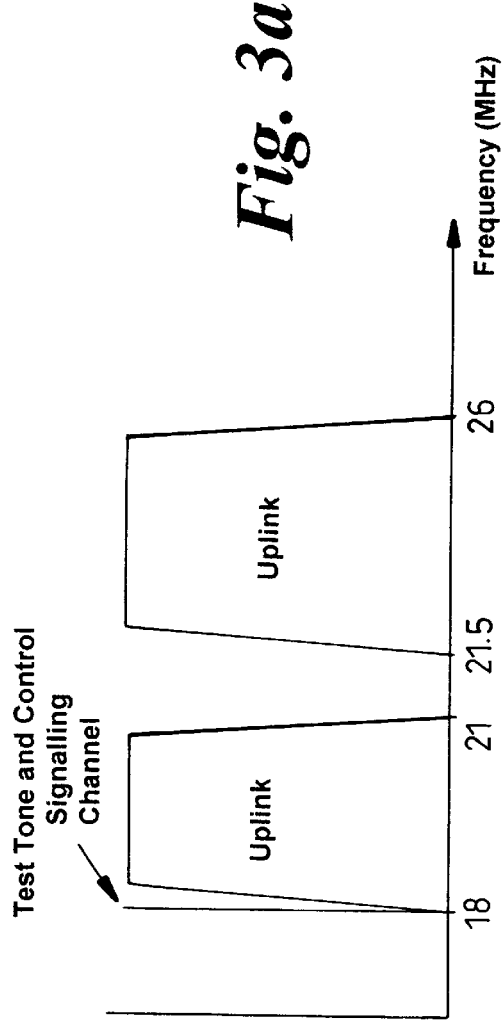
FIGS. 3a and 3b illustrate a typical cable frequency allocation plan for cellular traffic in the system of FIG. 1.
Figure 3B:
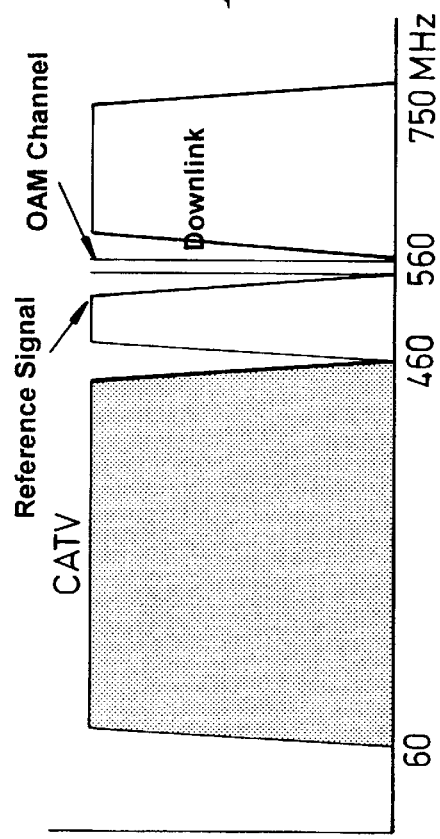

The frequency allocation on the cable path will depend on the particular CATV network and on the location within the network. The reverse channel or back haul used for the uplink may be susceptible to HF interference and impulsive noise commonly referred to as ingress. Care will thus need to be taken to avoid frequencies with a high level of ingress. A typical frequency allocation plan for both the uplink and the downlink is shown in FIG. 3. In FIG. 3a, the uplink band allocation of 18 to 25 MHz is derived from measurements which indicate a lower average ingress noise than other parts of the available spectrum. The gap at 21 MHz avoids the currently allocated amateur radio band. Typically, the signalling channel operates at 18 MHz occupying a 200 kHz band. The remaining bandwidth may be used to transport the PCS traffic in 200 kHz channels.

The downlink allocation (FIG. 3b) may be a 2 MHz block disposed between 450 and 750 MHz, the block being defined so as to coexist with the television channels that are carried by the network. The reference and signalling channels may be at 550 and 550.2 MHz respectively.

Figure 4:
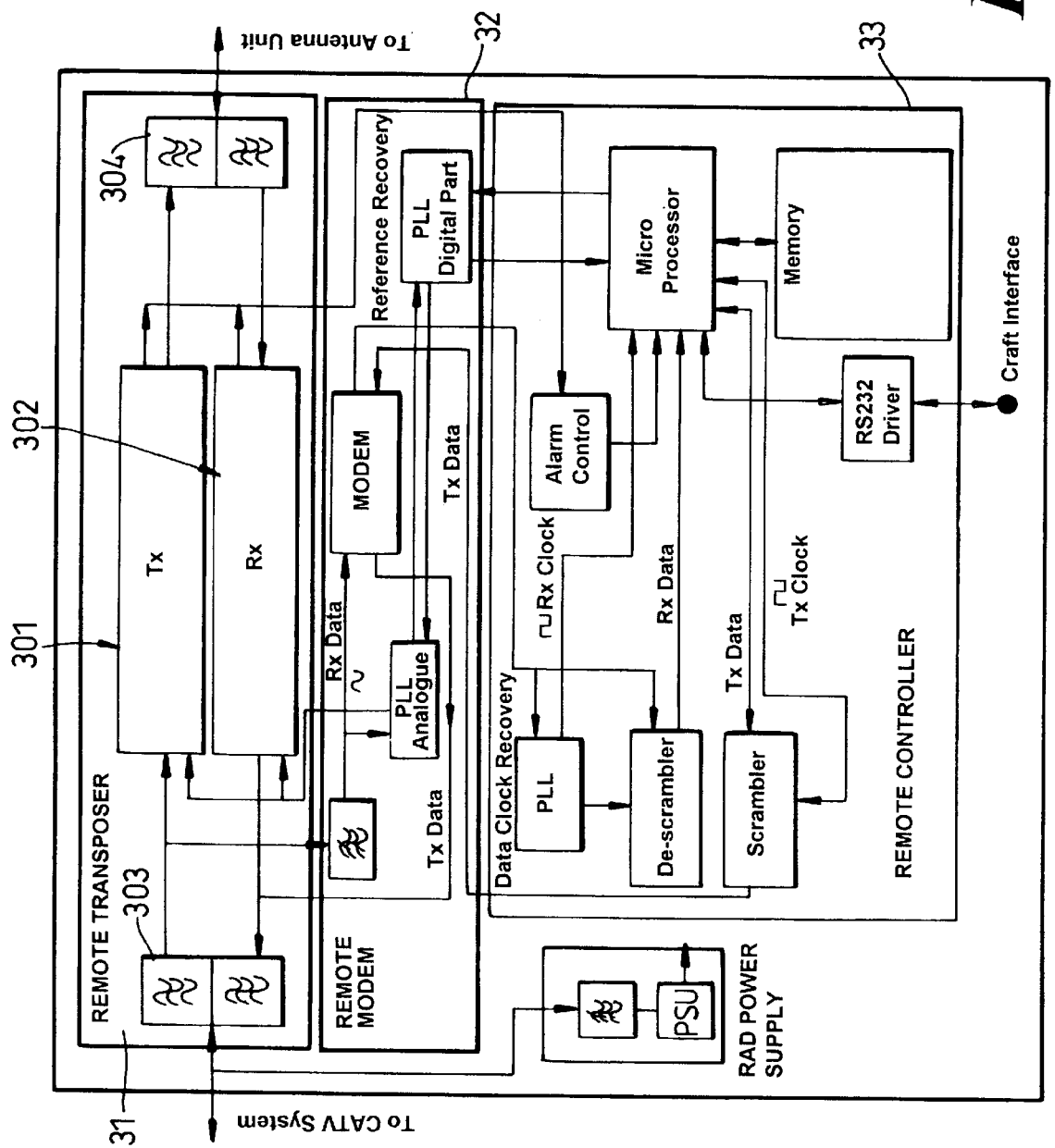
FIG. 4 shows the construction of a remote antenna device (RAD) for use in the system of FIG. 1.
Figure 5:
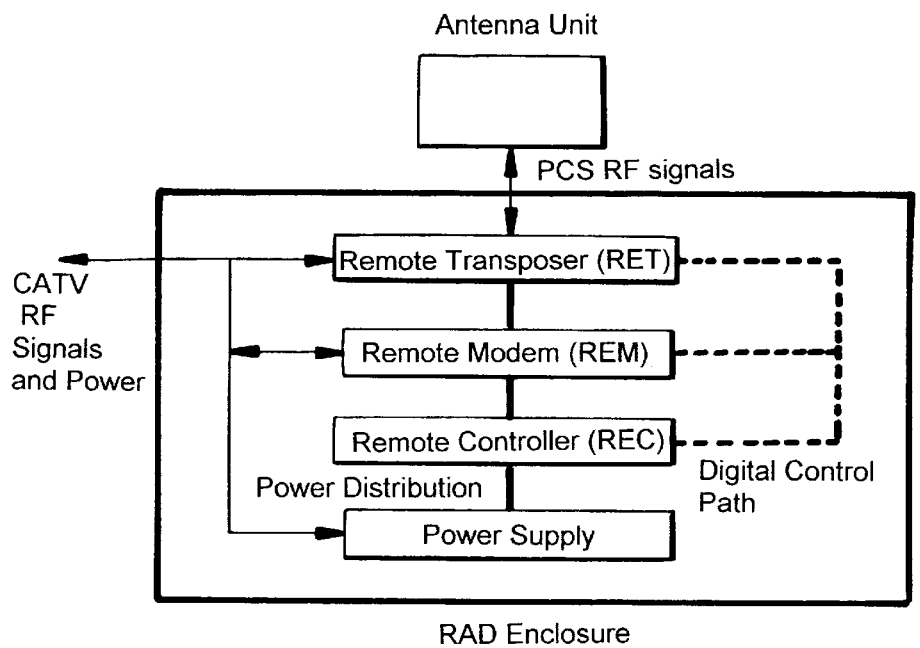
FIG. 5 is a functional block diagram of the RAD construction of FIG. 4.

The remote antenna device (RAD) is shown in FIG. 4 and its corresponding functional diagram is shown in FIG. 5. This device is coupled to the CATV network via a directional coupler and incorporates transmit (301) and receive (302) paths connected by diplex filtering (303, 304) to both the up and down links. The RAD is contained within a housing or enclosure comprises a remote transposer 31 providing an interface between the mobile radio and the CATV environments, a remote modem 32 which facilitates transmission of control data between the RAD and the system head end, and a remote controller 33. Communication between the RAD and the mobile terminals is effected via an antenna unit coupled to the RAD. The general functions of the RAD components or modules are detailed below.

The RAD Enclosure

The enclosure or housing comprises a mechanical structure containing the remote equipment. Advantageously, the housing is configured so as to be mounted on an overhead cable strand commonly used for equipment mounting in CATV systems. The housing can also be configured for mounting on a building or on a mast.

The Antenna Unit

This is used to radiate and receive the cellular radio signals and is mounted directly on the RAD enclosure.

The Remote Transposer

This module performs frequency transposition, filtering, amplification and dynamic range compression of the radio signals.

The Remote Controller

This module provides the control and configuration information for the RAD components and has four main functions:

The configuration and supervision of the RAD.

The provision of local configuration and monitoring via a RS232 standard interface 306 resident within the RAD.

The interpretation and formatting of digital information to be transmitted over the system control channels.

The performance of digital processing to extract a data clock from the downstream control signals.

The Remote Modem

This is used to facilitate the transmission and reception of digital control data between the DAS equipment at the system head end and the RAD. The remote modem is also used to recover the base station frequency reference which is distributed to all RADs via the network.

The Power Supply

This unit provides the powere for all the RAD equipment. The unit receives its input power from a pseudo square wave signal that is provided by the CATV infrastructure.

A further function of the RAD is compression of the dynamic range of the mobile signals received over the air interface to match the limited dynamic range available over the CATV upstream path. Thus, the 80 dB range typically required for conventional GSM traffic is compressed into a maximum of typically 45 dB such that the −104 dB minimum receiver sensitivity level specified within the GSM recommendations can be achieved.

Figure 6:
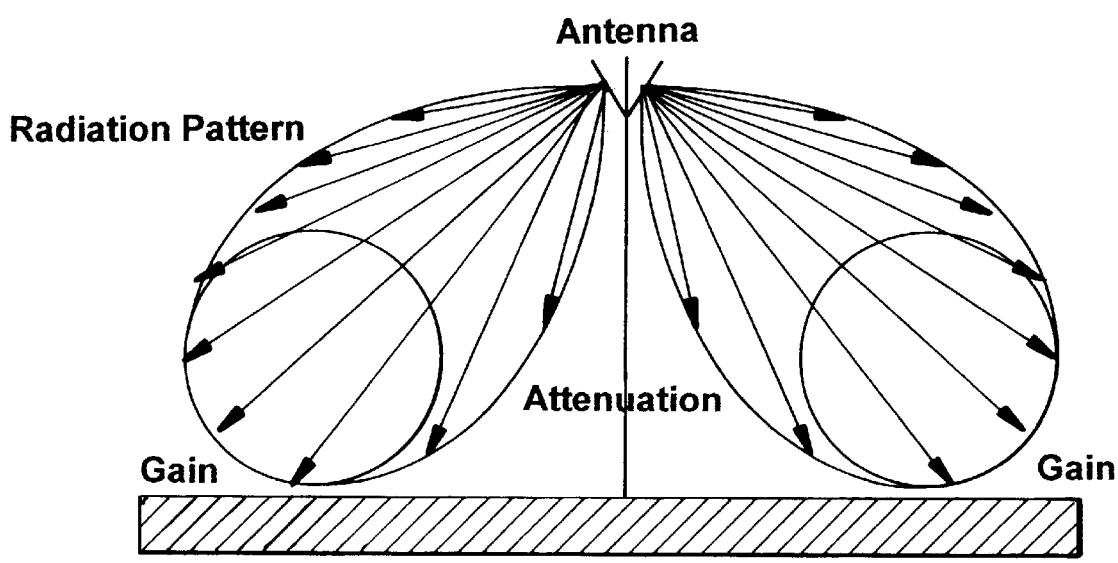
FIG. 6 shows a radiation pattern empoyeed by the RAD of FIGS. 4 and 5.

A preferred radiation pattern for the RAD antenna is illustrated in FIG. 6. The pattern is generally omnidirectional which, when shown in cross-section as in FIG. 6, comprises two lobes so shaped that signals from mobiles close to the antenna are attenuated while signals from mobiles further from the antenna are provided with gain. The attenuation of signals from mobiles close to the antenna reduces the potential incidence of near-far interference.

Figure 7:
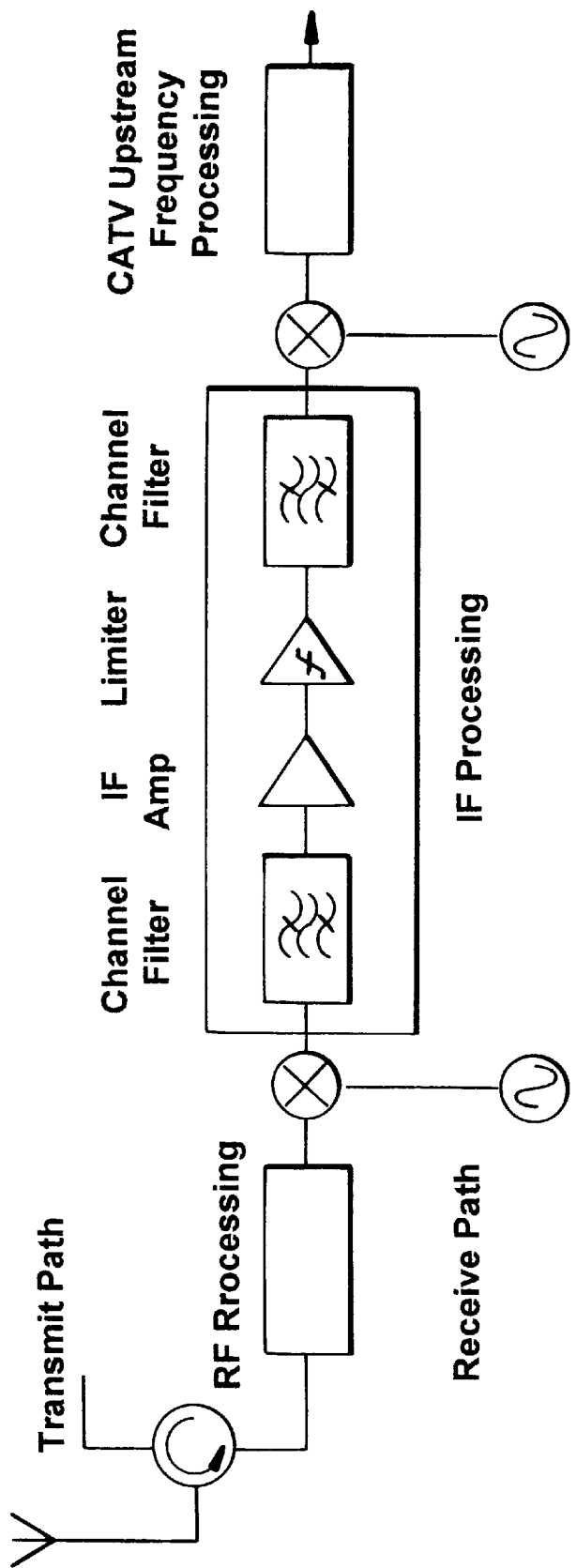
FIG. 7 is a block schematic diagram of the receive path of the RAD of FIGS. 4 and 5.
Figure 8:
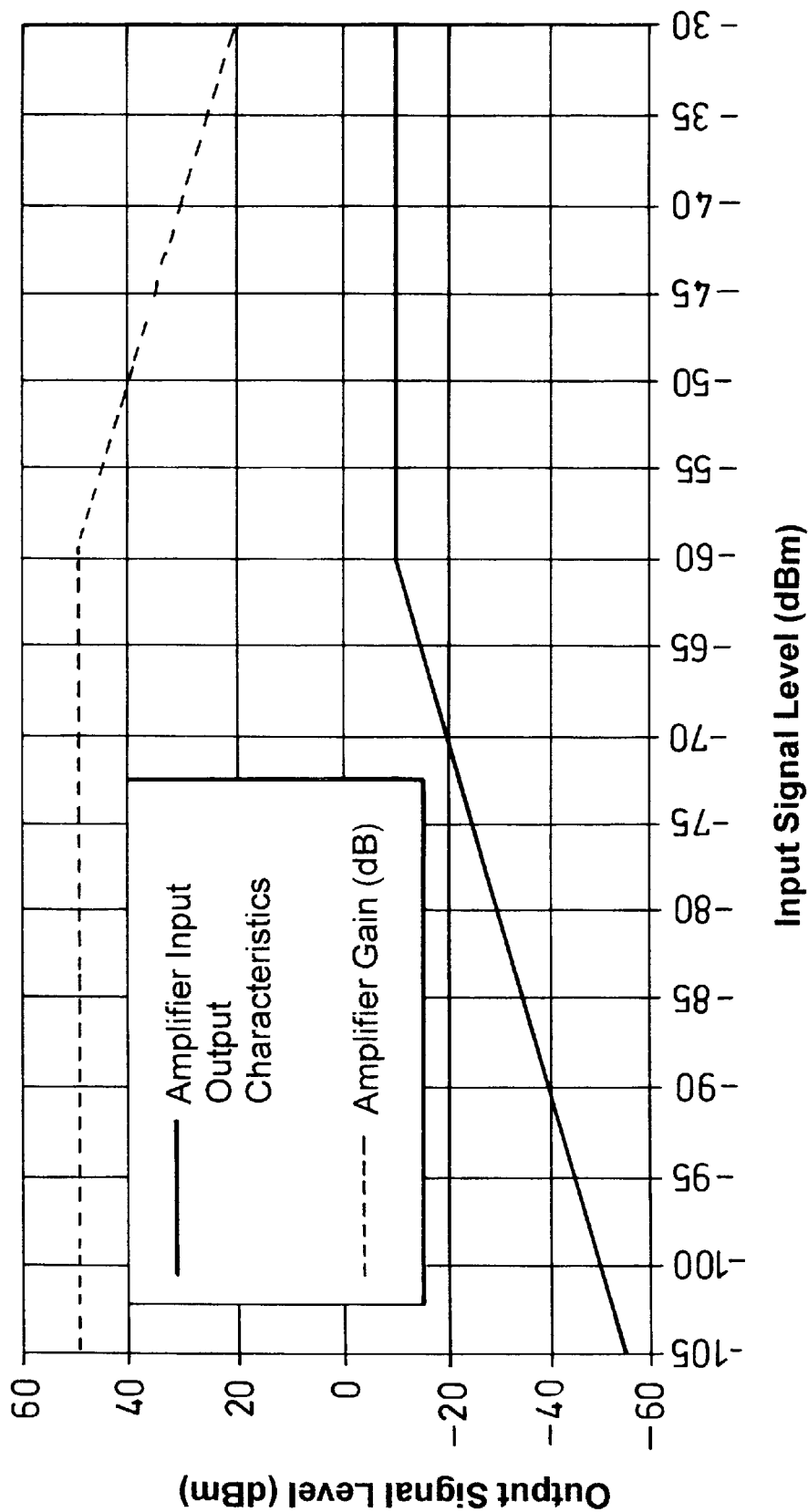
FIG. 8 is a graph illustrating the input/output charactersitic of the RAD of FIGS. 4 and 5 for uplink traffic.

FIG. 7 illustrates in schematic form the dynamic range compression technique employed in the RAD receive path. The path comprises an RF processing stage 61 coupled via a first mixer 62 to an IF processing stage whose input and output are provided with respective channel filters 63 and 64. The output from the IF processer is fed via a second mixer 65 to a CATV upstream frequency processing stage 66, A signal limiter stage 67 in the IF processing stage of the receive path is configured such that the RAD gain for low level signals is equal to the gain required for normal system operation, i.e. to compensate for the gain of the CATV signal path. However, signals received at or above a signal level of −60 dBm are effectively clamped. In effect the system discards performance gains for high level signals and utilizes the available dynamic range for low level signals. The typical RAD input/output characteristics providing this dynamic range compression are illustrated in FIG. 8. We have found that this limitation of the dynamic range of the cellular traffic signals to a maximum value significantly reduces the dynamic range limitations of the cable system.

Referring again to FIG. 7, the operation of the system is as follows. The uplink mobile signal is received via the antenna 66 and is isolated from transmitted signals within the circulator block 68. The RF signal is then filtered, amplified and down converted in the first mixer 62 to the intermediate frequency (IF). Dynamic range conversion then takes place. The IF signal is firstly filtered within the channel filter 63. This avoids the problems associated with adjacent channel interference which become particularly severe if signal limiting is employed. The signal is then amplified by IF amplifier 69 and limited by the limiter 67.

The process of limiting inevitably produces harmonics. These are removed by the second channel filter 64. The resulting signal is then converted to the required CATV upstream frequency in the second mixer 65 and again filtered and amplified before injection onto the CATV network. The local oscillators 71 and 72 associated with the first and second mixers respectively may be controlled in frequency from a pilot signal transmitted from the HESP at the system head end.

Figure 10:
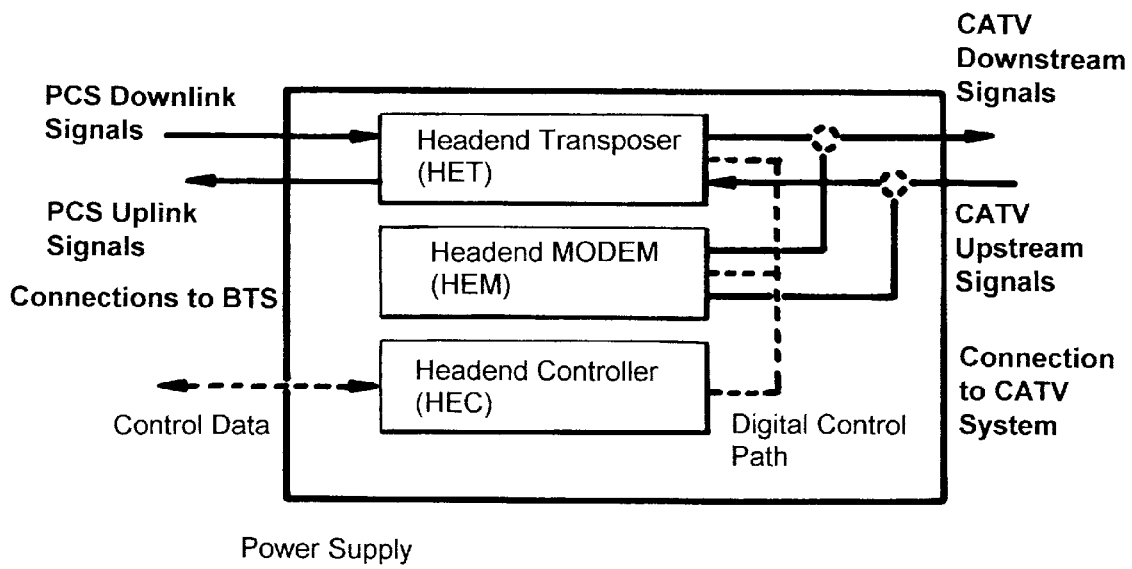
FIG. 10 is a functional block diagram of the HESP of FIG. 9.
Figure 9:
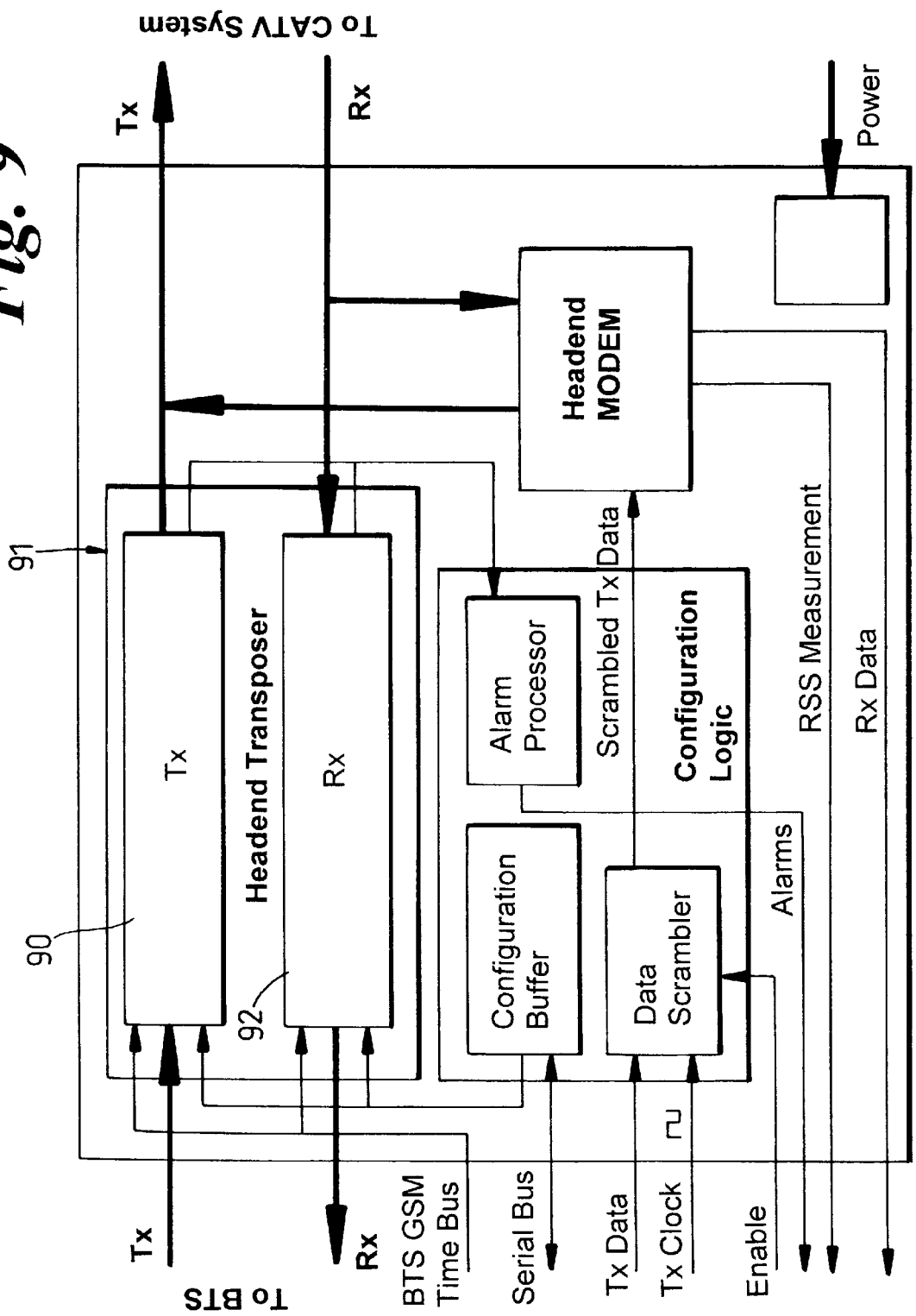
FIG. 9 shows the construction of a head end signal processor (HESP) for use in the system of FIGS. 1 and 2.

The construction of the head end signal processor (HESP) is shown in FIG. 9 and the corresponding functional diagram is shown in FIG. 10. In terms of signal processing, the HESP is similar in operation to the RAD, although the HESP has much reduced control functionality and is used simply to process RF signals received from other system entities. In the case of mobile signals this involves transposing signals received from the BTS or or CATV system to predefined frequencies. In the case of control data this involves either modulating signals from the head end system controller or demodulating signals received from the RADs.

Each of the BTS downlink signals is fed from the TRX associated with the HESP via a dedicated cable. This signal is fed to the transmit path 90 of the transposer 91 which in addition to frequency translation also performs filtering and amplification. This signal is then injected into the CATV network via a RF combiner. A downlink control channel is used to provide the RADs with configuration information, to poll the RADs for reports or alarms and to issue power up/power down commands.

On the uplink, the signals received on the receive path 92 from the CATV network are filtered to extract the mobile or cellular traffic which is then frequency converted to the cellular radio frequency and handed on to the base station.

To facilitate successful simulcasting, the gain of all the RADs in the simulcast cell as perceived by the base station is equalised. This may be achieved in the following way.

In the system, continuous HESP/RAD gain adjustment is provided on both the uplink and the downlink. The downlink gain may be controled by the following mechanism.

The RAD continuously monitors its own signal output power and issues internal power up/power down messages to regulate its output.

The HESP continuously monitors its own signal output power and issues internal power up/power down messages to regulate its output.

The uplink gain is managed via the HESP and may be effected by the following mechanism.

The HESP polls each of the RADs with which it is associated.

The HESP receives a response from each RAD. This response is processed and the received signal strength (RSS) on the upstream control channel is determined.

The HESP then determines from the received mobile signal strength the equivalent signal strength that would be received over the upstream information channel under conditions in which the received signal strength of the mobile is a maximum.

The power up/power down increment is determined by comparison of the required maximum RSS and received transformed RSS.

The result of the comparison is communicated to the RAD over the downstream control channel. The RAD then adjusts the power of both the control signal and the mobile signal.

The algorithm may be provided with a degree of hysteresis to prevent an unacceptably large number of power control commands.

In some applications there may be an advantage in operating the RADs in a simulcast cell in a quasi-synchronous manner e.g. to avoid persistent nulls in the cell. In such an arrangement the RAD synthesisers are designed such that a small offset frequency in excess of the 50 Hz offset discussed above can be provided. To overcome the consequential performance degradation introduced by this offset, the local oscillators used on the uplink path are then provided with filtering so that oscillator far out phase noise does not contribute significantly to the noise floor of the receiver.

It will be understood that although the technique has been described with particular reference to the GSM cellular system, it is by no means limited to this particular system but is of general application to cellular communications systems in the provision of an interface between a base station and groups of antennas serving mobile terminals.

I claim:

1. An arrangement for coupling a cellular communications base station with a plurality of mobile terminals via a CATV distribution network, the arrangement including a head end signal processor disposed at a head end of the CATV network and providing on a downstream path a first frequency conversion between a first cellular communications radio frequency and a first (downstream) CATV network transmission frequency, a plurality of remote antenna drivers disposed at a remote end of the CATV network each said driver being coupled to a respective antenna and each providing a second frequency conversion between the first cellular communications radio frequency and the first CATV network transmission frequency, said antennas providing radio communications with said mobile terminals, and receive path processing means coupled to the antennas and providing on an upstream path a third frequency conversion between a second cellular communications radio frequency and a second (upstream) CATV network transmission frequency, wherein the remote antenna drivers are arranged in groups, the drivers of each said group being operated on a common frequency in a simulcast mode, wherein each said receive path processing means incorporates means for compressing the dynamic range of cellular communications traffic carried on the cable network on an upstream path between the mobile terminals and the base station, wherein the remote antenna drivers of said group are provided each with a small frequency off-set from said simulcast frequency, said off-set limiting the persistence of a null to a maximum of a single data burst of telecommunications traffic, and wherein said receive path processing means comprises a first mixer arranged to convert the second cellular communications radio frequency to an intermediate frequency, limiting amplifier means arranged to amplify and compress the dynamic range of signals at said intermediate frequency, and a second mixer arranged to convert the amplified and dynamic range compressed intermediate frequency to said second CATV network transmission frequency.

2. An arrangement as claimed in claim 1, wherein each said antenna has a radiation pattern such that signals from mobile terminals close to that antenna are attenuated and signals from mobile terminals remote from the antenna are provided with gain SD-OS to provide a perceived signal level which is substantially distance independent.

3. An arrangement as claimed in claim 2, wherein each said remote antenna device has means for adjusting the gain of upstream signals to the head end signal processor such that the signals received by the base-station from the remote antenna devices are of substantially uniform signal strength.

4. A method of transmitting cellular communications traffic between a base station and a plurality of mobile terminals via a CATV distribution network, the network including a head end signal processor disposed at a head end of the CATV network and providing a first frequency conversion between a first cellular communications radio frequency and a second CATV network transmission frequency, a group of remote antenna drivers disposed at a remote end of the CATV network each said driver being coupled to a respective antenna and each providing a second frequency conversion between the first cellular communications radio frequency and the second CATV network transmission frequency, and receive path processing means coupled to the antennas and providing on an upstream path a third frequency conversion between a second cellular communications radio frequency and a second (upstream) CATV network transmission frequency, wherein the method comprises operating the antenna drivers of said group on a common nominal frequency in a simulcast mode, compressing the dynamic range of cellular communications traffic carried on the cable network on an upstream path between the mobile terminals and the base station, and providing the remote antenna drivers of said group each with a small frequency off-set from said simulcast frequency so as to limit the persistence of a null to a maximum of a single data burst of telecommunications traffic, and wherein said dynamic range compression comprises converting the second cellular communications radio frequency in a first mixer to an intermediate frequency, amplifying and limiting the intermediate frequency so as to compress the dynamic range of signals at said intermediate frequency, and converting the amplified and dynamic range compressed intermediate frequency in a second mixer to said second CATV network transmission frequency.

5. A method as claimed in claim 4, wherein each said antenna has a radiation pattern such that signals from mobile terminals close to that antenna are attenuated and signals from mobile terminals remote from the antenna are provided with gain whereby to provide a perceived signal level which is substantially distance independent.

6. A method as claimed in claim 5, wherein the gain of upstream signals to the head end signal processor such that the signals received by the base station from the antennas are of substantially uniform signal strength.

* * * * *